United States Patent Office 3,103,101
Patented Sept. 10, 1963

---

3,103,101
JET ENGINE FUEL
Joseph H. Jaffer, Jr., Bernardsville, N.J., assignor to Esso Research and Engineering Company, a corporation of Delaware
No Drawing. Filed Feb. 23, 1961, Ser. No. 90,944
6 Claims. (Cl. 60—35.4)

This invention concerns a novel and improved jet fuel composition and a method for operating a jet engine. More particularly, the present invention concerns an improved turbojet fuel composition which reduces ice formation in the fuel while inhibiting the deterioration of the fuel tank elastomeric coating.

The operating of jet engines at widely varying conditions of temperature and altitude has resulted in grave problems in regard to suitable fuel compositions to be utilized. One particularly serious problem involves the operational hazards of employing jet fuel containing dissolved and suspended water at low temperatures and at high altitudes. Jet engine aircraft are normally equipped with filters located in the fuel pumping system in order to remove suspended matter in fuel which might interfere with normal engine operation. At low temperatures and especially at those very low subfreezing temperatures, such as from —45° F. to —76° F., associated with high altitudes, dissolved and suspended water in the jet fuel forms ice in the narrow passageways of the fuel flow system or on the filter surface or on the sludge layer on the filter surface. Hydrocarbons utilized as jet fuels are capable of dissolving small quantities of water from the air during normal weather, from storage tanks, and the like. Additional water from these sources can also become suspended in the fuel after the fuel has become water saturated. It is this dissolved and suspended water which, upon lowering of the temperature, freezes and creates an icing problem by plugging fuel lines and filters. The formation of ice results in the creation of a considerable pressure drop in the fuel system and sometimes the complete obstruction of the fuel flow with resultant flame-out and loss of the aircraft.

In order to alleviate this critical problem, freezing point depressant-type additives have been incorporated into jet fuel compositions to allow operation of the aircraft at low temperatures without excessive ice formation. These additives have usually been low molecular weight ether-alcohols, alcohols, and the like, such as set forth in U.S. Patent 2,952,121, issued September 13, 1960.

Unfortunately, the incorporation of these additives has not been entirely practical and has created a new problem of a serious nature. It has been found that the use of these additives at concentration levels required for adequate freezing protection below about —45° F. results in a general deterioration and impairment in the elastomeric top coating and sealants of the jet aircraft fuel tank and other elastomers with which the fuel containing the additive comes into contact. The glycol ethers, such as those formed by the reaction of ethylene oxide or propylene oxide with aliphatic alcohols, e.g. ethanol and the like, are especially prone to attack elastomeric coatings at concentration levels when incorporated in jet fuels in excess of about 0.1% by volume. The effect on the elastomer is usually evidenced by a change in appearance, a softening or peeling effect, a color change, a blistering, corrosion pits, surface bubbles and the like. This attack on the elastomers utilized in the fuel system and especially the fuel tanks results in loss of the corrosion protection afforded by the coating, attack by the fuel on tank sealants, contamination of the fuel, possible chemical alterations of some additives, an increase in deleterious polymeric material in fuel, which induces filter plugging, and other grave problems affecting the safe and efficient operation of high flying jet aircraft. These problems have been recognized by the military authorities, so that special requirements have been initiated for anti-icing additives in fuels.

It is therefore an object of the present invention to provide an improved jet fuel composition and method of operating a jet engine which inhibit the formation of ice at very low temperatures, while exhibiting a reduced tendency towards deteriorating the elastomeric material in the fuel tank and fuel distribution system.

Another object is to provide an additive combination for turbo-jet fuels which reduces filter plugging, at temperatures below —45° F., caused by ice and which inhibits the degradation of the elastomeric top coating or sealants or turbojet aircraft fuel tanks. Further objects and benefits are apparent to those skilled in the art in the light of the instant disclosures.

The applicant has discovered a novel additive composition which gives superior anti-icing effectiveness, while exhibiting a markedly reduced tendency to attack elastomeric coatings and sealants in the fuel system. The operation of jet engines can thus be improved by incorporating into the jet fuel in minor amounts an additive combination comprising a small amount of an organic alkyl glycol-ether and a minor amount of a compound selected from the class consisting of an ether ester, a diether, and a glycol. Jet engine fuels incorporating this additive combination in amounts between 0.001 and 3.0 volume percent, preferably between 0.01 and 1.5 volume percent, and especially between 0.2 and 1.0 volume percent, have reduced tendency to form ice at subfreezing temperatures and additionally inhibit the deterioration of the elastomer coating of the fuel tank.

The fuel compositions applicable to the present invention are those hydrocarbon fuels utilized in jet and turbine engines, such as turbo-jet, turbo-prop, turbo-fan, ramjets, pulse jets, and the like, but particularly to those fuels used in turbo-jet, turbo-prop, and turbo-fan engines. The petroleum distillate fuels to which the additive composition is added include those fuels boiling between about 90° and 550° F., those boiling between 300° F. and 550° F. These fuels normally contain at least 10 volume percent of paraffinic components, and meet the specifications set forth in ASTM specifications for aviation turbine fuels D-1655-59T. The fuels encompassed by this invention additionally include those jet fuels meeting U.S. military specifications MIL-F-25524A(1), MIL-J-5624D, MIL-F-25558C(1), and MIL-F-25656. The fuels may also contain commonly used additives such as corrosion inhibitors, oxidation inhibitors and the like.

The glycol-ether compound of the present invention includes those compounds having the formula

$$R\text{—}O\text{—}(CH_2\text{—}CH_2\text{—}O)_n\text{—}H$$

wherein R is an alkyl group of from 1 to 4 carbon atoms and $n$ is a whole number integer of from 1 to 5, while in the preferred compound $n$ is 1. Suitable compounds include the lower monoalkyl ether derivatives of ethylene glycol such as mono- methyl, ethyl and propyl ethers of ethylene glycol and diethylene glycol, and the like. The preferred compound is 2-methoxyethanol.

The aliphatic glycol components of the inventive combination are aliphatic diols, either saturated or unsaturated, substituted or unsubstituted, containing from 4 to 21 carbon atoms per molecule. The preferred diols are alkyl diols characterized by having an alkyl radical directly attached to at least one of the carbon atoms to which a hydroxyl group is attached. The alkyl radical may contain from 1 to 4 carbon atoms, although it is preferred that the alkyl group be a methyl group. Among the preferred alkyl diols, those having from 6 to 8 carbon atoms per molecule are most preferred, particularly the hexylene glycols, as, for example, 2-methyl-2,4-pentane diol, hexane diol-2,5 and 2-methyl-pentene-5-diol-2,4. Especially preferred among the hexylene glycols is 2-methyl-2,4-pentane diol.

Due to economic availability and cost and overall performance, the glycols and especially the hexylene glycols are the preferred compounds for use in the inventive combinations described.

The ether esters of the present inventive combination are those compounds having the formula:

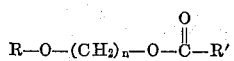

wherein R and R' are alkyl groups of from 1 to 4 carbon atoms and n is an integer from 1 to 4, but preferably n is 2. Thus, the preferred ether ester is a lower monoalkyl ether of an ethylene glycol acetate. Suitable compounds that may be employed include 2-methoxyethyl acetate, 2-ethoxyethyl acetate, 2-butoxyethyl acetate, 2-ethoxyethyl formate, 3-methoxypropyl acetate, and the like. The preferred compound is 2-methoxyethyl acetate.

The glycol diether component of the present combination includes those compounds having the formula:

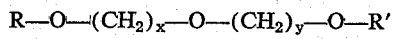

wherein R and R' are alkyl groups of from 1 to 4 carbon atoms, and x and y are integers of from 1 to 4. Preferably x and y are 2 and the alkyl groups are methyl groups. Suitable compounds would thus include bis(2-methoxy ethyl) ether, bis(2-ethoxyethyl)ether and the like.

The especially preferred combination of the instant invention is that of 2-methoxyethanol and 2-methyl-2,4-pentane diol. Those combinations wherein the glycol-ether component comprises between 20 and 50 volume percent of the additive composition are effective anti-icing additives without unduly affecting elastomer compositions of the fuel system. The preferred compositions are those where the glycol-ether component comprises between 20 and 35 volume percent of the additive composition.

The elastomer compositions which exhibit no significant deterioration in contact with the improved fuel of this invention include those natural, reclaimed, vulcanized, and synthetic material, polymers and combinations thereof which are utilized as top coating material in military and commercial jet aircraft fuel tanks and fuel systems or in any place where the elastomer is contacted by the fuel composition. These elastomers include those synthetic materials and combinations thereof prepared by the: polymerization of a diolefinic material, e.g. a butadiene, either alone or in combination with an alkylated aromatic, e.g. styrene, such as Buna S; polymerization of a diolefin material, e.g. butadiene with acrylonitrile, to form material like Buna N; and the like. Additional materials used are phenolic resins, polysulfide polymers, Buna N and phenolic resin combinations, natural rubber, neoprene, silicone rubbers, polyurethanes, and the like and combinations thereof which are affected or degradated by contact with jet fuel having more than 0.1 volume percent of an aliphatic glycol ether anti-icing additive.

Those elastomeric combinations which comprise Buna N-phenolic resin combinations are especially useful as top coatings in fuel tanks and are those with which the improved fuels described may be contacted with safety and towards which the present invention is particularly directed. Those elastomeric compositions meeting the military specifications MIL-S-4383, MIL-S-7502, MIL-S-8802, and the like are those with which the additive combination may be used without undue deterioration or degradation of the film characteristics.

The effectiveness of the present inventive combinations may be ascertained by the following examples.

EXAMPLE 1

The effectiveness of the additives in inhibiting ice formation in jet fuels was demonstrated by a laboratory fuel flow system test wherein jet fuel with and without additives is continuously pumped through a fine wire mesh screen filter at a constant rate. A cooling coil in the fuel system circuit permits decreasing the temperatures of the fuel at a controlled rate. The pressure drop across the filter is recorded frequently, and a rise in this pressure drop indicates the formation of ice on the filter. The temperature recorded as the icing temperature is that temperature at which a rapid rise in pressure drop was noted. A JP-4 jet fuel saturated with water was used to obtain the data of Tables I and II. The acceptable military target for effective anti-icing of jet fuels is that the fuel should have a freezing point of −45° F. or lower when containing 2 cc. of water/gallon of fuel above the water saturation of the fuel at 70° F. and which additive does not significantly attack the elastomer coating of the fuel tank.

Table I

ANTI-ICING EFFECTIVENESS OF ADDITIVE COMBINATION IN JP-4 [1]

| Composition | Vol. Percent Additive Concentration | Icing Temp., °F. |
|---|---|---|
| 1. None | | +10-12 |
| 2. 2-methoxyethanol | 0.1 | −30 |
| 3. Bis(2-methoxyethyl)ether | 0.2 | +5 |
| 4. Bis(2-ethoxyethyl)ether | 0.2 | +5 |
| 5. 2-methyl-2,4-pentanediol | 0.2 | −11 |
| 6. 2-methyl-2,4-pentanediol | 0.3 | −21 |
| 7. 2-Methoxyethylacetate | 0.2 | −11 |
| 8. 2-Methoxyethylacetate | 0.4 | −18 |
| 9. 0.20% vol. bis(2-methoxyethyl) ether and 0.10% vol. 2-methoxyethanol | 0.3 | −65 |
| 10. 0.17% vol. 2-methyl-2,4-pentanediol and 0.08% vol. 2-methoxyethanol | 0.25 | −69 |
| 11. 0.23% vol. 2-methoxyethyl acetate and 0.07% vol. 2-methoxyethanol | 0.3 | −55 |

[1] JP-4 jet fuel containing 2 cc/gallon of water above water saturation at 70° F.

From the foregoing data, it is apparent that more than 0.1 volume percent of the glycol ether must be employed to approach anti-icing protection below −45° F. The extremely low freezing point achieved by the applicant's additive combination utilizing only minor amounts of less than 0.1 volume percent of the glycol ether demonstrates that unexpected and effective anti-icing protection may be achieved without excessive amounts of the glycol ether.

EXAMPLE 2

The above glycol-ethers are relatively effective anti-icing additives; however, when utilized at concentration levels high enough to provide very low temperature anti-icing effectiveness i.e. protection below about −45° F. with fuel containing 2 cc./gal. free water, they adversely affect the jet fuel tank coating. The inventive additive combination not only provides superior anti-icing protection at very low temperature, but functions additionally to inhibit degradation of the fuel tank coating. Thus, the additive combination provides unexpectedly better protection to the fuel tank elastomer on a comparative freezing point basis than the glycol-ethers alone at the concentration level required by the glycol-ether additives to provide anti-icing protection below about −45° F.

The relative effect of the additive on the test panels containing top coat material meeting military specifications MIL-S-4383 and comprising a Buna N-phenolic resin coating was obtained by immersing the test panels in jet fuel and in water with and without additives for a certain period of time and at a certain temperature. Accelerated test results were obtained by employing higher than normal temperatures.

The test panels are then removed and the top coat films observed visually and tested for softening by means of a pencil hardness test. This test consists of comparing the hardness of the film to that of standard drawing leads. The leads used are sanded to produce flat ends with squared edges. Each lead so prepared is pressed against the film at a 45° angle until the film is torn or the squared edge of lead crumbles. The number of the lead which barely ruptures the film before crumbling is recorded as the hardness of the film. The pencil hardness scale used in order of increasing hardness is: 4B, 3B, 2B, B, HB, F, H, 2H, etc.

The data of Table II obtained in this manner demonstrate the superiority of the additive combination over the glycol-ether alone.

*Table II*

EFFECT OF ANTI-ICING ADDITIVES IN JP-4 ON FUEL TANK FILM HARDNESS [1]

| Additive | Freezing Point Protection, °F. | Vol. Percent Additive Concentration | Pencil Hardness [2] |
|---|---|---|---|
| 1. None | +10-12 | | H |
| 2. 2-methoxyethanol | −30 | 0.1 | H |
| 3. 2-methoxyethanol | below −45 | 0.2 | HB |
| 4. Blend 9, Table I | −65 | 0.3 | H |
| 5. Blend 10, Table I | −69 | 0.25 | H |
| 6. Blend 10, Table I | below −69 | 0.50 | H |
| 7. Blend 11, Table I | below −45 | 0.26 | H |
| 8. Blend 11, Table I | below −45 | 0.52 | H |

[1] 10-day immersion at immersion temperature of 145° F.
[2] Venus drawing leads No. 842.

From the foregoing data, it is apparent that the top coat film for a given degree of anti-icing protection is, surprisingly, more affected by the glycol-ether, 2-methoxyethanol than by the inventive additive combination. The use of 0.2 volume percent 2-methoxyethanol, while giving satisfactory anti-icing protection of below −45° F., gave unsatisfactory film hardness results. The applicant's blends gave very effective anti-icing protection of below −45° F., while giving satisfactory film hardness results. These results are unexpected in that some of the blends contain a considerable amount above 0.1% volume of the glycol-ether.

The data of Tables I and II taken together thus demonstrate that a very low level of anti-icing protection, i.e. below −45° F. or from −45° F. to about −76° F., may be achieved with a significant reduction in the softening of fuel tank coating by the use of the inventive combination. By virtue of this development, the problem created by earlier high concentration levels of glycol-ether anti-icing additives is now resolved, and anti-icing protection can now be extended to much lower temperatures without fear of excessive fuel tank deterioration.

What is claimed is:

1. An improved petroleum distillate turbo fuel boiling in the range of between 90 and about 550° F. to which has been added between 0.01 and 1.5 volume percent of an additive mixture whereby anti-icing protection is obtained down to −45° F.; said mixture consisting of from 20 to 50 volume percent of 2-methoxyethanol and from 50 to 80 volume percent of a compound selected from the class consisting of 2-methyl-2,4-pentanediol, bis-(2-methoxyethyl) ether, and 2-methoxyethyl acetate.

2. An improved petroleum distillate turbo fuel boiling in the range between 90° F. and about 550° F. to which has been added between 0.2 and 1.0 volume percent of an additive mixture consisting essentially of between 20 and 50 volume percent of 2-methoxyethanol and between 50 and 80 volume percent of bis(2-methoxyethyl) ether.

3. An improved petroleum distillate turbo fuel boiling in the range between 90° F. and about 550° F. to which has been added between 0.2 and 1.0 volume percent of an additive mixture consisting essentially of between 20 and 50 volume percent of 2-methoxyethanol and between 50 and 80 volume percent of 2-methoxyethyl acetate.

4. An improved petroleum distillate turbo-jet fuel boiling in the range between 90 and about 550° F. to which has been added between 0.01 and 1.5 volume percent of an additive mixture whereby anti-icing protection is obtained down to −45° F., said mixture consisting of between 20 and 50 volume percent of 2-methoxyethanol and between 50 and 80 volume percent of 2-methyl-2,4-pentanediol.

5. An improved petroleum distillate turbo-jet fuel boiling in the range between 90 and about 550° F. to which has been added between 0.01 and 1.5 volume percent of an additive mixture consisting essentially of between 20 and 50 volume percent of 2-methoxyethanol and between 50 and 80 volume percent of bis(2-methoxyethyl) ether.

6. An improved petroleum distillate turbo-jet fuel boiling in the range between 90 and about 550° F. to which has been added between 0.01 and 1.5 volume percent of an additive mixture consisting essentially of between 20 and 50 volume percent of 2-methoxyethanol and between 50 and 80 volume percent of 2-methoxyethyl acetate.

References Cited in the file of this patent

UNITED STATES PATENTS 2,807,525     Foreman     Sept. 24, 1957